United States Patent Office 3,033,729
Patented May 8, 1962

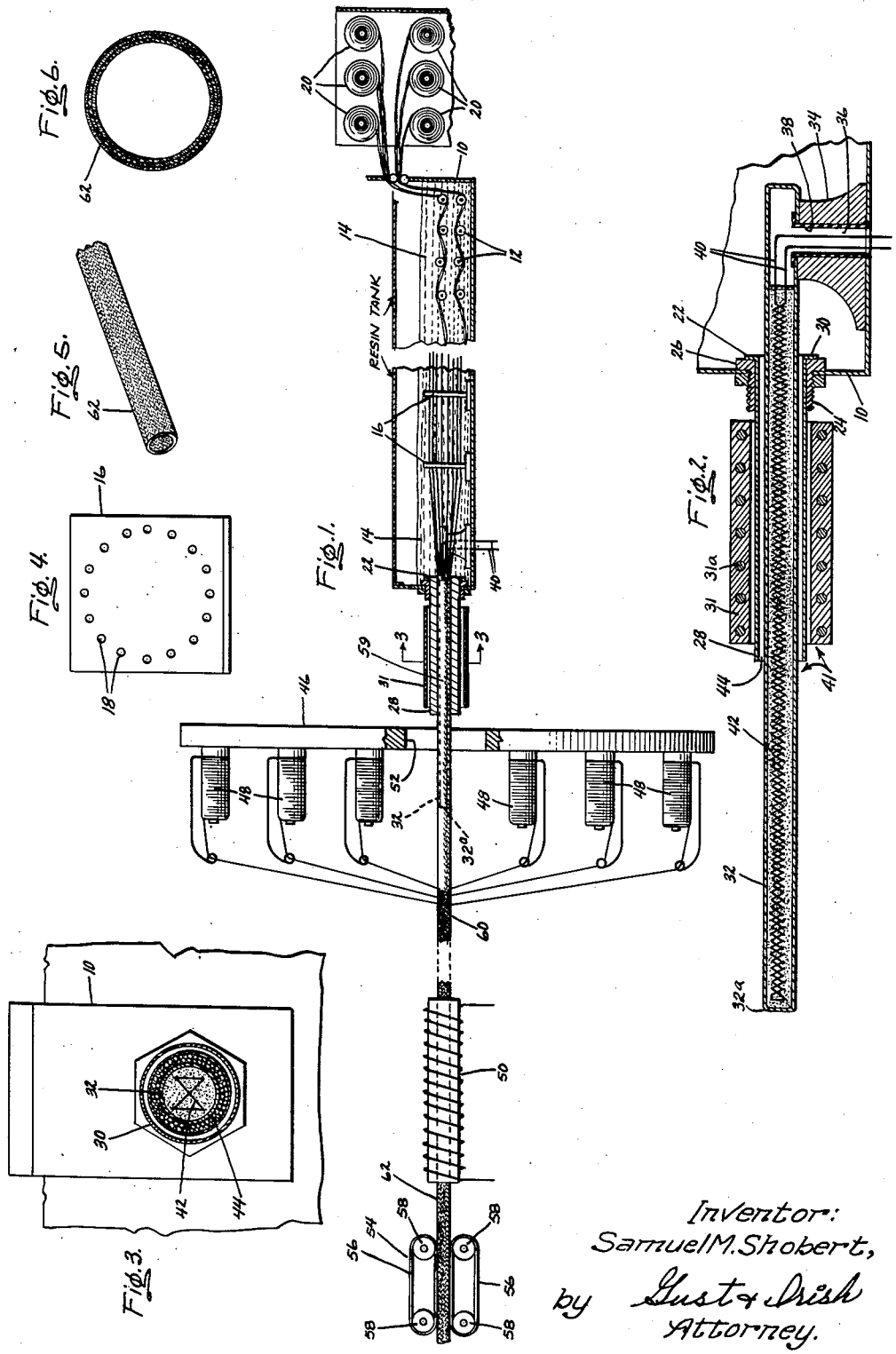

3,033,729
METHOD OF CONTINUOUSLY MAKING GLASS-REINFORCED PLASTIC TUBING
Samuel M. Shobert, R.R. 2, Box 16050, Mishawaka, Ind.
Filed Aug. 5, 1957, Ser. No. 676,119
8 Claims. (Cl. 156—149)

The present invention relates to a method of fabricating tubing, and more particularly to a continuous process for fabricating glass-reinforced, plastic tubing.

In Meek Patent #2,684,318, issued July 20, 1954, there is disclosed and claimed a method for fabricating glass-reinforced plastic rod of solid cross-section. This method comprises the steps of continuously drawing a plurality of glass threads through a bath of liquid heat-hardenable resin, collecting these threads into a rod-like bundle, compressing the rod-like bundle into a predetermined cross-sectional shape and size, passing the bundle through an oven for curing the resin, and then cutting the cured bundles into desired lengths. The finished bundle is of solid-cross-section, the glass threads and resin being distributed therethrough.

In Francis Patent #2,602,766, issued July 8, 1952, there is disclosed a method for fabricating hollow, glass-reinforced plastic rods. These hollow rods are fabricated by first arranging a plurality of glass threads into a longitudinal bundle, inserting a mandrel into the central portion of the bundle so as to provide a core therefor, and finally braiding glass thread around the outer surface of the thread bundle while the mandrel is in place. This braided bundle is thereafter immersed in resin which is cured to bond firmly the threads together in self-supporting form. The mandrel is thereafter removed, providing a hollow center for the finished rod. More particularly, the Francis patent discloses a "batch" method for fabricating tubular rod as contrasted with the "continuous" method of the Meek patent by which solid rod is fabricated. The "batch" method is discontinuous in the sense that the lengths of tubular rod are fabricated individually; i.e., discontinuously, one rod at a time. In this batch method, a bundle of dry threads is manually formed. Secondly, a mandrel is inserted in the center of the bundle, the threads being manually distributed over the surface of the mandrel. Thirdly, a braid of dry threads is applied to the exterior of this mandrel-supported bundle. Fourthly, the bundle with braid applied and with mandrel in place is inserted into a mold. Fifthly, resin is injected into the mold, and lastly, the resin is cured. When the resin is cured, the mold is removed from the bundle, and the mandrel is withdrawn, leaving a hollow center. Another rod is made by following the same steps; hence, the term "batch method."

It has been found that this rod as just described having both longitudinal and braided reinforcement provides both flexural and torsional strength as well as great bursting strength. A tube consisting only of plastic and longitudinal thread reinforcement has little or no torsional or bursting strength, since the circumferential binding force of the plastic is relatively weak. Up to the time of the present invention, it has not been possible economically to produce, in a continuous length, tubing of longitudinally and circumferentially reinforced plastic, and it is to the solution of this problem to which this invention is directed.

It is an object of this invention to provide a method of fabricating a continuous length of tubing of longitudinally and circumferentially reinforced plastic or resin.

It is another object of this invention to provide a method of fabricating tubular rod of reinforced plastic in a facile and economical manner adaptable to large-scale commercial production.

In accordance with this invention, there is provided a method of fabricating continuously glass-fiber reinforced plastic tubing comprising the steps of continuously forwarding a plurality of glass threads under tension along a predetermined path, coating these threads with a bonding material as they traverse a first predetermined location, gathering said threads as they traverse a second predetermined location into a hollow rod-like bundle, these threads being arranged substantially parallel, partially curing the bonding material in said bundle as it traverses a third predetermined location to secure the threads together, applying a braid of glass threads to the partially cured bundle as it traverses a fourth predetermined location, the partially cured bonding material of the bundle impregnating the braided threads, and completing the cure of the bonding material as the composite bundle traverses a fifth predetermined location.

To the accomplishment of the above and related objects, my invention may be embodied in the forms illustrated in the accompanying drawings, attention being called to the fact, however, that the drawings are illustrative only, and that specific change may be made in the specific construction illustrated and described, so long as the scope of the appended claims is not violated.

In the drawings:

FIG. 1 is an elevational view in part section and in part diagram of the apparatus by which the method of this invention is accomplished;

FIG. 2 is an enlarged sectional view of the pre-curing portion of the apparatus of FIG. 1;

FIG. 3 is a sectional illustration taken substantially along section line 3—3 of FIG. 1;

FIG. 4 is an elevational view of one grouping bushing;

FIG. 5 is a perspective illustration of a tubular rod produced according to the method of this invention; and FIG. 6 is a cross-section of such rod.

Referring to the drawings, and more particularly to FIG. 1, the apparatus comprises a relatively long tank or vessel generally indicated by reference numeral 10. In this tank are mounted a plurality of rollers 12, all of these rollers being submerged in liquid heat-hardenable resin or plastic. The level of such liquid material is indicated by the numeral 14. Situated toward the front or left of the rollers 12 in the tank 10 are a plurality of grouping bushings 16 spaced apart as shown and secured to the bottom of the tank. Each of these bushings 16 is provided with a plurality of circumferentially arranged, thread-receiving apertures 18, the number of apertures being dependent upon the physical characteristics desired in the finished rod. These bushings 16 are also immersed in the liquid resin.

To the rear of the tank 10 (toward the right as viewed in FIG. 1) is disposed a creel or frame (not shown) on which is mounted a plurality of spools 20 of glass thread. This thread can be the same as that used in either of the Meek or Francis patents aforementioned, and the resin or plastic material used can also be the same as that used in these two patents and, further, both the reinforcement and the plastic material can be the same as that commonly used in the industry for fabricating glass thread reinforced plastic fishing poles.

An opening 22 is formed in the left-hand end of the tank 10 to receive therethrough a threaded nipple or bushing 24. This bushing 24 is provided with a head or flange 26 on the right-hand end thereof and receives over the threaded portion a locknut for securing the bushing in place. Press-fitted inside the bushing 24 is an elongated tubular member or forming tube 28 having a flange 30 on the right-hand end which prevents the tube 28 from being withdrawn from the nipple 24. Surrounding this tube 28 is a covering 31 which is provided with heating elements 31a of suitable design. Such heating elements may comprise electrical heating units of the type commonly used in electrical appliances, the covering 31 serving to enclose such heating elements and to direct the heat toward the forming tube 28.

Coaxially disposed within and spaced radially from the forming tube 28 is a mandrel 32. This mandrel 32 is an elongated, rod-like member which may have any desired cross-sectional shape, in the present instance being illustrated as circular. The mandrel is supported at its right-hand end on a small stand or bracket 34 secured to the bottom of the tank 10. The bracket 34 has an opening 36 and a sleeve 38 of electrical insulation for accommodating the electrical leads 40 leading to an electrical heater 42 contained within the mandrel 32. This heater 42 may comprise the same structure as that used in the heaters of ordinary electric stoves, and as will appear from the following, different types of heating devices may be employed without departing from the scope of this invention.

Noting FIGS. 2 and 3 in particular, an annular tubular space is provided between the mandrel 32 and the forming tube 28, this space being indicated by the reference numeral 44. The mandrel 32 and the forming tube 28 so arranged constitute an annular die, the cavity of which being the space 44. This space leads or opens into the resin tank 10 and is used in providing the tubular shape of the rod fabricated by the apparatus.

As seen in FIG. 1, disposed toward the left of the covering 31 and the heater 42, which in combination may be considered a precuring oven generally indicated by numeral 41, is a braiding mechanism indicated generally by the reference numeral 46. This braiding mechanism may be the same as that employed in the Francis Patent No. 2,602,766, or that employed in the Shobert application Serial No. 560,563, filed January 23, 1956, and entitled "Reinforced Plastic Rods and Method of Fabricating the Same." Mounted on this braider 46 are a plurality of spools 48 of thread, the threads of these spools being the same as that on the spools 20.

Situated to the left of the braider 46 is a post-cure oven 50 of tubular construction and heated by means of electrical heating units of the same type or character as commonly employed in electrical appliances. The opening or hollow portion of this oven 50 is situated in axial alignment with the mandrel 32 and opening 52 in the braider 46. Toward the left of the oven 50 and in axial alignment therewith is a pulling mechanism or puller indicated generally by the reference numeral 54, this puller 54 comprising two rubber belts 56 spaced apart as shown and supported on suitable V-pulleys 58. The purpose of the puller 54 will be explained more fully in the following.

In operation, the apparatus is supplied with liquid resin in the tank 10 and glass threads from the spools 20. These threads are passed into the tank to be wetted by the resin over and under the rollers 12. The contact of the threads with the rollers serves to produce some resistance to longitudinal movement of the threads, which results in tensioning the threads as well as to remove air bubbles or the like entrained in or on the threads thereby assuring that the threads will be thoroughly wetted and impregnated by the liquid resin. The threads are next passed through the apertures 18 in the grouping bushings 16 to provide an enlarged annular or tubular shape to the threads. Thereafter, the threads are passed through the space 44 between the mandrel 32 and the forming tube 28, the threads at this point together with the plastic material forming a solid tubular bundle 59. Heat is applied to the interior and exterior of this tubular bundle, the forming tube 28 and the mandrel 32 determining the interior and exterior shapes of the bundle. Enough heat for a period of time is applied to the bundle to cause a partial cure only of the resin, this cure only being sufficient to cause the bundle to retain its shape after it has passed off the left-hand end of the mandrel 32. As a matter of fact, this partial cure leaves a considerable quantity of non-cured resin or plastic in the bundle for a purpose which will now be explained.

Continuing the leftward movement of the bundle, it is next passed through the opening 52 in the braider 46 there to receive a braid or lamina of helical glass threads on the outer surface. Operation of the braider 46 therefore results in wrapping a plurality of dry threads around said outer surface which are transverse to the longitudinally extending threads. This braid is conventional, being essentially the same as that employed in the Francis Patent #2,602,766 and the Shobert application aforementioned.

By reason of the partial cure previously effected in the resin, the act of braiding the glass threads onto the exterior of the bundle as indicated at numeral 60, the tube will retain its tubular or hollow shape and will not be collapsed by the braiding action. Thus, as the tubular bundle leaves the mandrel 32, it is self-supporting in shape and can receive the braid on the outer surface thereof from the braider 46 without being collapsed.

Since the resin is only partially cured at the time the braid is applied thereto, the uncured resin will flow through and impregnate the braided threads. Thus, no exterior or auxiliary resin-wetting agency is required in order to wet the braiding threads prior to their application to the tubular bundle. The uncured resin in the tubular bundle itself is sufficient for this purpose.

After the braid is applied to the tubular bundle and is thoroughly impregnated by the uncured resin therein, it is drawn through the post-curing oven 50 for completing the cure of all the resin. The composite, braided bundle which is withdrawn from the oven 50 is, therefore, completely cured, and for all practical purposes, completed. The puller 54 frictionally grips the opposite sides of the composite bundle 62 as it is withdrawn from the oven 50 and projects it toward the left. The bundle 62 may thereafter be cut into suitable lengths, depending upon the purposes to which the tubing is to be put. Such tubing is shown in FIGS. 5 and 6.

As will now be appreciated, tubular rod composed of longitudinally extending and braided glass threads imbedded in a plastic material is continuously made by the method of this invention. The threads from the spools 20 are continuously drawn through the liquid resin in the tank 10, through the bushing 16, the forming aperture 44 in the precuring oven 41, the braider 46, the post-curing oven 50, and, finally, the puller 54, after which the rods are cut to length.

By using two curing cycles, one a partial cure and the other a complete cure, it is possible to provide on the outside of the tubular bundle composed of longitudinally extending threads a tubular lamination of braided threads, the partial cure serving to provide enough strength in the tubular bundle to prevent it from crushing or collapsing under the force of the braiding action. Also, the partial curing leaves enough uncured or partially cured resin which impregnates the braided dry threads, thereby resulting in a composite bundle of longitudinally extending and braided threads completely imbedded in resinous material. The final cure effected in the oven 50 serves to bond securely all of the threads together.

Tubing made according to this method is of uniform wall thickness throughout its extent and possesses considerable flexural and torsional strength. Additionally, the tubing has excellent bursting strength whereby it may be used in high-pressure or hydraulic systems. The braided and longitudinal threads form two tubular laminations of uniform composition and dimension, thereby contributing to uniform physical characteristics in the finished product.

Alternative to braiding at a point ahead of the end 32a of mandrel 32 is extending the mandrel to a point ahead of the braid application at about the location of the numeral 60. With the mandrel 32 so extended, the hollow core of longitudinal threads will be internally supported thereby preventing the braiding operation from crushing the core. This feature renders the precuring (partial curing) step less critical and lends greater flexibility in the method for mass production of the product. For example, it would not be necessary that the precure be carried to an extent to make the core self-supporting for application of the braid.

However, control of the precure to an extent rendering the core self-supporting serves to simplify the mandrel 32 construction inasmuch as the length thereof may be substantially reduced thereby reducing the requirements of straightness and rigidity.

What is claimed is:

1. The method of continuously fabricating glass fiber reinforced plastic rod comprising the steps of continuously drawing a plurality of glass threads under tension along a given path and in a given direction, coating said threads with a bonding material as they traverse a first location, gathering said threads as they traverse a second location into an elongated bundle, said threads being arranged substantially parallel, partially curing the bonding material in said bundle as it traverses a third location to secure said threads together and to provide a partially cured self-supporting bundle, applying a braid of glass threads to said partially cured bundle as it traverses a fourth location to provide a composite bundle, the partially cured bonding material of the bundle impregnating the braided threads, and completing the cure of said bonding material as the composite bundle traverses a fifth location.

2. The method of fabricating continuously glass fiber reinforced plastic tubing comprising the steps of continuously drawing a plurality of glass threads under tension along a given path and in a given direction, coating said threads with a bonding material as they traverse a first location, gathering said threads as they traverse a second location about an elongated mandrel into a hollow elongated bundle, said threads being arranged substantially parallel, partially curing the bonding material in said bundle while still about said mandrel as it traverses a third location to secure said threads together, and to provide a partially cured self-supporting bundle, applying a braid of glass threads to said partially cured bundle as it traverses a fourth location to provide a composite bundle, the partially cured bonding material of the bundle impregnating the braided threads, and completing the cure of said bonding material as the composite bundle traverses a fifth location.

3. The method of fabricating continuously glass fiber reinforced plastic tubing comprising the steps of continuously pulling a plurality of glass threads in a given direction and wetting the threads with a liquid heat-hardenable resin, forming said threads into a hollow bundle, partially curing the resin in said bundle to provide a self-supporting hollow shape thereof, braiding a plurality of glass threads onto said hollow bundle, the partially cured resin flowing into the braided threads, and completing the cure of said resin to bond all of the threads together into a composite hollow bundle.

4. The method of fabricating continuously glass fiber reinforced plastic tubing comprising the steps of continuously drawing glass threads in a given direction through a bath of liquid heat-hardenable resin, continuously gathering said threads about a mandrel into a hollow elongated bundle, continuously curing the resin only partially leaving a portion of the resin uncured, continuously wrapping a plurality of threads around said bundle, the resin which is uncured wetting the last mentioned threads, and continuously completing the cure of said resin to bond all of said threads into a composite bundle.

5. The method of fabricating continuously glass fiber reinforced plastic tubing comprising the steps of continuously drawing glass threads in a given direction through a bath of liquid heat-hardenable resin, continuously gathering said threads about a mandrel into a hollow elongated bundle, continuously curing the resin only partially leaving a portion of the resin uncured, continuously braiding a plurality of dry threads to the exterior of said bundle, the dry threads being transverse to the threads of the bundle, the dry threads thus applied being wetted by the uncured resin in the hollow bundle, and continuously completing the cure of said resin to bond the threads together.

6. The method of fabricating continuously glass fiber reinforced plastic tubing comprising the steps of continuously drawing glass threads in a given direction through a bath of liquid heat-hardenable resin, gathering said threads about a mandrel into a hollow elongated bundle, continuously and simultaneously heating the interior and exterior of said bundle for a period of time, said period of time being sufficient to effect only a partial cure adequate to provide a self-supporting hollow shape for said bundle and to leave remaining a quantity of uncured resin in said bundle, continuously applying to the exterior of said bundle a plurality of encircling threads which are wetted by the uncured quantity of resin, and continuously completing the cure of said resin to bond all of the threads together.

7. The method of fabricating continuously glass fiber reinforced plastic tubing comprising the steps of continuously drawing glass threads in a given direction through a bath of liquid heat-hardenable resin, continuously gathering said threads about a mandrel into a hollow elongated bundle, continuously precuring said bundle leaving some of the resin uncured, continuously applying a lamina of helical glass threads onto the exterior of said bundle, the uncured resin impregnating said helical threads, and continuously completing the cure of said resin to bond the threads together.

8. The steps in the method of continuously fabricating a laminated reinforced plastic rod comprising continuously forming a bundle of plastic wetted glass threads, continuously partially curing said resin until the bundle becomes self-supporting and to provide a partially cured bundle, continuously applying helically extending threads to the exterior of said partially cured bundle, the partially cured resin impregnating the helical threads, and continuously completing the cure of said resin to bond all of said threads together.

References Cited in the file of this patent

UNITED STATES PATENTS

| | | |
|---|---|---|
| 2,308,825 | Rawlings | Jan. 19, 1943 |
| 2,558,855 | Knewstubb et al. | July 3, 1951 |
| 2,571,717 | Howald et al. | Oct. 16, 1951 |
| 2,573,361 | Rodgers et al. | Oct. 30, 1951 |
| 2,602,766 | Francis | July 8, 1952 |
| 2,694,661 | Meyer | Nov. 16, 1954 |
| 2,723,705 | Collins | Nov. 15, 1955 |
| 2,741,294 | Pancherz | Apr. 10, 1956 |
| 2,749,643 | Scott | June 12, 1956 |
| 2,760,549 | Nash et al. | Aug. 28, 1956 |
| 2,778,404 | Macy et al. | Jan. 22, 1957 |
| 2,782,833 | Rusch | Feb. 26, 1957 |
| 2,810,424 | Swartswelter et al. | Oct. 22, 1957 |
| 2,816,595 | Hudak | Dec. 17, 1957 |